April 24, 1934.  C. E. LYON  1,956,463
METHOD AND APPARATUS FOR THE DISPOSAL OF SEWAGE
Filed May 16, 1932
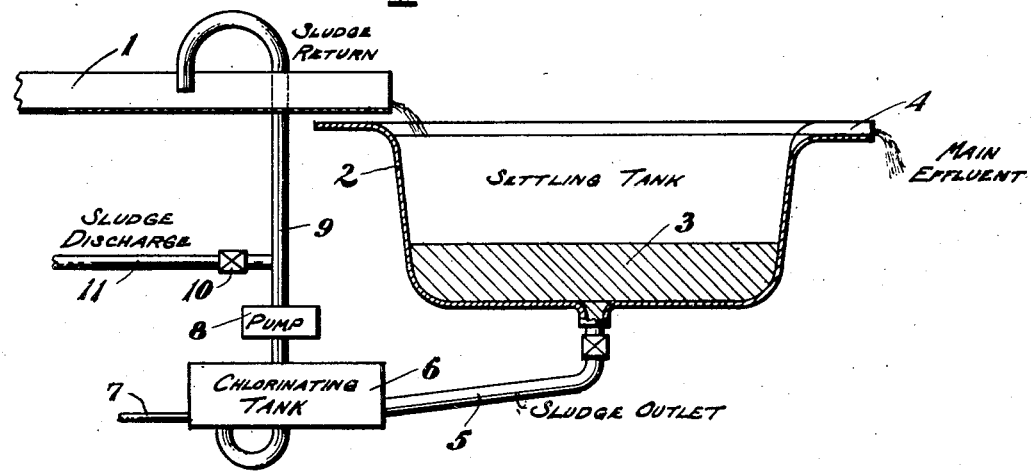
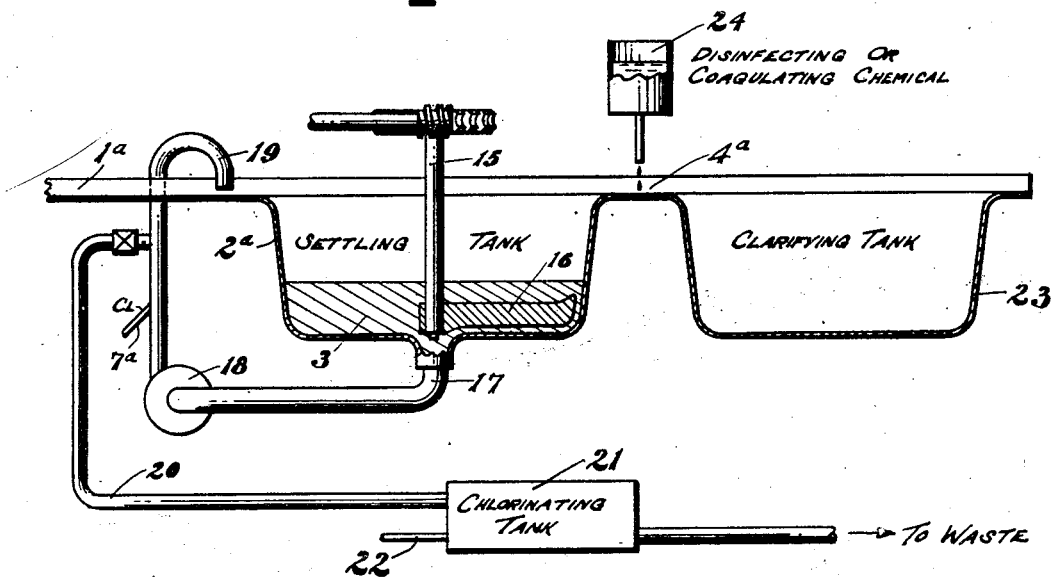
INVENTOR
CHAS. E. LYON
BY Harold Elwin Smith
ATTORNEY Patented Apr. 24, 1934

1,956,463

UNITED STATES PATENT OFFICE 1,956,463

METHOD AND APPARATUS FOR THE DISPOSAL OF SEWAGE

Charles E. Lyon, Painesville, Ohio, assignor to Clifton N. Windecker, Painesville, Ohio Application May 16, 1932, Serial No. 611,549

8 Claims. (Cl. 210—28)

This invention relates to sewage disposal and has for its objects the provision of a method and apparatus whereby municipal sewage can be rendered sterile and inoffensive without liability of interference by trade wastes or by dilution due to rains or periodic excessive uses of water as on wash days, and all this with much smaller and less expensive equipment than at present; other objects of the invention are the provision of a method and apparatus for the disposal of such sewage which requires the use of only inexpensive reagents, and which can be controlled in a simple, reliable, and accurate manner without necessitating undue supervision of a scientific nature, which is free from odor, does not attract flies or other insects, produces a liquid effluent which is substantially lacking in decomposable organic matter, and a stable, inoffensive solid waste which is not subject to decomposition; while further objects and advantages of the invention will become apparent as the description proceeds.

My improved method of disposal depends in large part upon the discovery that the chlorination of a concentrated sewage sludge gives rise to a product of very different characteristics than does the chlorination of a dilute sewage. Chlorination of raw sewage is accompanied by no observable flocculation or precipitation of the organic matter contained therein, and previous attempts to dispose of such sewage solely by chlorination have been unsatisfactory since the water absorbs the greater part of the chlorine while the solids therein become only superficially chlorinated and when released soon become septic as the result of residual bacteria. However if a sewage sludge of substantial concentration, say 25,000 parts of organic matter per million (which corresponds to the consistency of table catsup) be strongly chlorinated a totally different physical result is obtained, the mixture not only losing its offensive characteristics but becoming highly flocculent and somewhat fibrous in its nature, and at the same time becoming bleached to a grayish color, and having its specific gravity so increased as to settle readily and with substantial completeness leaving a clear, supernatant liquid. This difference in behavior first becomes apparent to careful observation with concentration of around 1000 parts per million, and for the purposes of my improved method any concentration of sludge above this critical value can be employed, although for the purpose of obtaining an improved physical flocculation and a much expedited settling I prefer to start my flocculation with a sludge of substantially greater concentration. As to the amount of chlorine required it is possible to produce flocculation under conditions of concentration not sufficient to produce complete sterilization, but it is much preferable from a practical standpoint to chlorinate this small amount of material to complete sterility.

If now this chlorinated and thereby flocculated sludge be mixed with the incoming raw sewage, the filtering and entraining effect of this flocculent mass removes the suspended organic matter in a very thorough manner. One way of doing this is to mix the flocculated sludge with the raw sewage and allow the mixture to stand in a sedimentation tank until clarified by the settling of the flocculated sludge which entrains and carries down most of the organic matter, leaving a decantate which can generally be released immediately, and the sludge alone returned to the chlorinating apparatus, whereby the previously chlorinated part receives a second treatment and the newly caught organic matter receives a first treatment, thus increasing the amount of flocculated filtering material. In this way only the organic portion of the sewage which requires intensive treatment is subjected to such treatment and the great bulk of the incoming liquid is discarded at the outset. This is of particular importance in that rain water, trade-wastes, and the like have no adverse influence upon the operation, merely increasing the volume of the innocuous or inorganic substances which require no treatment. An important feature of my invention is the production from the sludge itself of a filtering and clarifying material which is not only efficacious but when fully treated is antiseptic, since the strongly chlorinated flocculated sludge when returned to the raw sewage not only removes the organic matter therefrom with very great thoroughness, but also imparts sufficient chlorination to the liquid to render innocuous any traces of organic substances not removed therefrom; and from the practical standpoint one of the best ways of checking the operation is by periodically observing the degree of chlorination of the main effluent.

The flocculated sludge is circulated repeatedly between the settling apparatus and the chlorinating apparatus until the optimum working volume is achieved, after which further increase in the volume of this flocculated sludge is prevented by abstracting a portion of the same, either continuously or intermittently as may be necessary to dispose of the increment. This under the usual working conditions has an appearance, consistency, and odor considerably like the beaten chlorinated pulp of a paper mill except that its color is a shade of gray, and the mass can be filtered, dried, or de-watered in any convenient or suitable manner, since it is completely sterile, wholly devoid of readily-decomposed substances, and entirely pleasant to handle. For example, if thrown on a sand bed or on the ground so that the water can be separated it merely hardens down and remains innocuous without odor, fermentation, or attractiveness to insect life, or it can be incinerated without offensive odor.

The chlorine is very inexpensively procured and is preferably supplied in liquid form. For the treatment of general municipal sewage I have had good results with the use of about one-fourth pound of chlorine per pound of organic matter in the sewage, but I do not restrict myself to this proportion since this is probably somewhat more than is imperative and since different sewages require different treatments to some degree. It is not imperative that the sludge be chlorinated to such an extent that the effluent from the settling tank shall have been disinfected entirely by the sludge since additional chlorine can be supplied for this purpose; or the effluent can be led to additional sedimentation or disinfection chambers of any kind, if desired. In general, however, a great advantage of my process is that the treatment with this flocculated sludge serves to discard immediately from 95% to 98% of the total volume of raw sewage in a septic and highly dilute condition, reserving only the remaining 2% to 5% for intensive treatment, with a corresponding economy in the amount of apparatus necessary, to which is added the freedom from all danger that the working medium may be rendered suddenly useless by some unexpected inflow of trade-waste as in the case of bacterial sedimentation chambers.

The flocculated sludge is highly stable both wet and dry. This renders it not only inoffensive after being discarded, but enables it to be stored suspended in water in tanks ready for future use as a clarifying agent. Thus, for example, in a small plant, where no night operator is present, a tank full of the chlorinated sludge can be arranged to flow gradually into the incoming raw sewage during the night, and this sludge and the organic matter captured thereby is collected in settling tanks to be pumped out and chlorinated during working hours.

The chlorine demand of the sludge is very great, being 80% to 90% of the entire demand, only the balance of 10% to 20% being required for the comparatively great volume of effluent. This process applies the chlorine where it is most effective. The chlorine absorbed by the sludge is very firmly held. While raw sewage varies widely in its composition a common assumption is about 250 parts of settleable organic matter per million parts of the raw liquid. A great advantage of this process resides in the fact that by a simple, rapid, and purely mechanical process of filtration or entrainment as compared to sedimentation, the greater preponderance of the liquid (usually over 95% of the whole mass) can be discarded immediately. It will be understood that I do not limit myself to a single filtration or entrainment, since it is desirable in some cases to filter in a plurality of successive stages, with or without the addition of coagulating chemicals such as alum, ferric chloride, etc. These can be added either to the raw sewage, or to the sludge before or after chlorination, since their presence does not injure in any way the operation or texture of the flocculent material; in fact the addition of coagulating chemicals such as those mentioned to the flocculated sludge substantially enhances their clarifying effect, and are themselves not injured by the succeeding chlorination.

The degree of treatment of the raw sewage may vary widely without departing from my invention. I prefer to filter or entrain and clarify the same until the effluent is substantially clear and free from decomposable organic matter; but it is possible in cases where less thorough original clarification is effected to provide supplemental clarifying or filtering expedients for a later treatment of the effluent.

This process can be performed either by the continuous or by the batch method or by any desired combination of the two methods. It is of course inexpedient in the case of a large municipality to collect the raw sewage for any substantial length of time; but the chlorination of the flocculated sludge with its increment of untreated, organic matter is sometimes more conveniently effected in batches. The clarification of the raw sewage can either be effected by causing it to flow through chambers or vats having this flocculent material in suspension, being shifted from chamber to chamber as necessary to enable the introduction and removal of the flocculated and untreated sludges, or suitable mechanical stirring-means can be employed for simultaneously producing the necessary relative movement between the flocculent material and the sewage, while at the same time progressing the flocculated material along a path which shall in due course return it to the chlorinating apparatus.

In the drawing accompanying and forming a part of this application I have shown in the most diagrammatic possible form some typical apparatus for the performance of the invention above described. Fig. 1 is a sectional diagrammatic view through one form of apparatus; and Fig. 2 is a sectional diagrammatic view through another form of apparatus.

Describing by reference characters the parts shown in Fig. 1, the raw sewage is introduced through a suitable conduit 1 into a settling tank 2 wherein the sludge settles as a layer 3 and the liquid effluent escapes at 4. The sludge is transmitted by means of a suitable conduit 5 to a suitable tank or other piece of apparatus 6 where it is subjected to the action of chlorine (either gas or liquid) introduced through a suitable pipe 7 with or without agitation as may be considered necessary, and the chlorinated flocculated material thereby produced is moved by the pump 8 through the pipe 9 back to conduit 1 or settling tank as may be desired where it assists in entraining and carrying down the organic matter in the form of a new sludge which is continuously rechlorinated and returned. To prevent an undue increase in the amount of this sludge, a portion of the same is discharged through the valve 10 and pipe 11 to any suitable place of disposal as may be necessary or desirable in the view of the operator.

In the form shown in Fig. 2 the raw sewage entering through the conduit 1ª passes into the settling tank 2ª in which is mounted on a very slowly rotating vertical shaft 15 a suitable revolving arm or blade 16 by means of which the accumulated sludge 3 is moved to the discharge outlet 17 whence it is moved by the pump 18, part back to the conduit 1ª by way of the conduit 19 and part discharged to waste by way of the conduit 20, chlorine being introduced at the pipe 7ª in any suitable point in the circulating system. In this case I have shown the pipe 20 as leading to a chlorinating tank 21 to which more chlorine can be added by way of a pipe 22 to make certain that the sludge is rendered completely sterile, this being specially important in cases where the working sludge is less completely chlorinated. Also in Fig. 2 I have shown the effluent discharge 4ª as leading into a subsequent clarifying tank 23, a suitable disinfecting or coagulating chemical being added from a tank 24 at any suitable or convenient point.

One reason why I have illustrated the apparatus diagrammatically is to indicate that I do not limit myself to any specific apparatus excepting such as may be apt or convenient for the performance of the different steps or manipulations constituting my improved process, and in general I do not limit myself in any respect excepting as specifically recited in my several claims which I desire may be construed each according to its own limitations and without reference to limitations contained in other claims.

Having thus described my invention what I claim is:

1. In a process of treating sewage, or like liquid body containing a correspondingly large amount of organic solids in suspension, the steps which consist in concentrating such solids without change in composition as to the major portion thereof to form an organic sludge, and then chlorinating such organic sludge with an amount of chlorine sufficient to chlorinate substantially all of the organic compounds therein.

2. In a process of treating sewage, or like liquid body containing a correspondingly large amount of organic solids in suspension, the steps which consist in concentrating such solids without change in composition as to the major portion thereof to form an organic sludge, and then treating such organic sludge to chlorinate the solid matter therein, with an amount of chlorine sufficient to chlorinate substantially all of the organic compounds therein.

3. In a process of treating sewage, or like liquid body containing a correspondingly large amount of organic solids in suspension, the steps which consist in concentrating such solids without change in composition as to the major portion thereof to form an organic sludge, treating such organic sludge to chlorinate substantially all of the organic solid matter therein and then returning the organic sludge thus treated to a fresh body of sewage.

4. In a process of treating sewage, or like liquid body containing a correspondingly large amount of organic solids in suspension, the steps which consist in concentrating such solids without change in composition as to the major portion thereof to form an organic sludge, treating such organic sludge to chlorinate substantially all of the organic solid matter therein and then disposing of sludge thus treated.

5. In a process of treating sewage, or like liquid body containing a correspondingly large amount of organic solids in suspension, the steps which consist in concentrating such solids without change in composition as to the major portion thereof to form an organic sludge, treating such sludge to chlorinate substantially all of the organic solid matter therein and then returning a portion of the sludge thus treated to a fresh body of sewage and disposing of the remaining portion of such treated sludge.

6. In a process of treating sewage, or like liquid body containing a correspondingly large amount of organic solids in suspension, the step which consists in mixing with such sewage a settling and entraining material produced by chlorinating substantially all of the organic solids in a sludge consisting of such organic solids concentrated without change in composition as to the major portion thereof.

7. In a process of treating sewage, or like liquid body containing a correspondingly large amount of organic solids in suspension, the steps which consist in mixing with such sewage a settling and entraining material produced by the action of chlorine upon a sludge consisting of such organic solids concentrated without change in composition as to the major portion thereof, whereby additional sludge of the character described is formed, separating such sludge from the clarified liquid, chlorinating substantially all of the organic solids in the same, then using a portion of such chlorinated sludge in the first step and repeating the cycle.

8. A new product comprising chlorinated settled and concentrated organic sewage sludge, being fibrous and rendered inodorous and aseptic by liquid or gaseous chlorination.

CHARLES E. LYON.